United States Patent
Kosaka et al.

[11] Patent Number: 5,698,121
[45] Date of Patent: Dec. 16, 1997

[54] THREE-DIMENSIONAL LASER BEAM MACHINING APPARATUS USING YAG CUTTING TOOL

[75] Inventors: Tetsuya Kosaka; Akiko Takano, both of Oshino-mura, Japan

[73] Assignee: Fanuc Ltd., Yamanashi, Japan

[21] Appl. No.: 707,730

[22] Filed: Sep. 3, 1996

[30] Foreign Application Priority Data

Aug. 31, 1995 [JP] Japan .................... 7-245111

[51] Int. Cl.⁶ .................................... B23K 26/08
[52] U.S. Cl. .................. 219/121.67; 219/121.78
[58] Field of Search ............. 219/121.6, 121.67, 219/121.72, 121.78, 121.79, 121.8, 121.81, 121.82; 364/474.08; 395/82, 80; 318/568.21, 568.11; 901/41, 2, 14

[56] References Cited

U.S. PATENT DOCUMENTS

| | | | |
|---|---|---|---|
| 4,469,930 | 9/1984 | Takahashi | 219/121.72 |
| 4,626,999 | 12/1986 | Bannister | 364/474.08 |
| 4,661,681 | 4/1987 | Bannister | 219/121.78 |
| 4,794,222 | 12/1988 | Funayama et al. | 219/121.78 |
| 5,067,086 | 11/1991 | Yamazaki et al. | 364/474.08 |
| 5,216,222 | 6/1993 | Masuda | 219/121.78 |
| 5,466,909 | 11/1995 | Nihei et al. | 219/121.72 |
| 5,489,758 | 2/1996 | Nihei et al. | 219/121.78 |

FOREIGN PATENT DOCUMENTS

| | | | |
|---|---|---|---|
| 62-134192 | 6/1987 | Japan | 219/121.78 |
| 4-127992 | 4/1992 | Japan | 219/121.67 |
| 5-216516 | 8/1993 | Japan | 219/121.78 |

*Primary Examiner*—Teresa J. Walberg
*Assistant Examiner*—Gregory L. Mills
*Attorney, Agent, or Firm*—Staas & Halsey

[57] ABSTRACT

A three-dimensional laser beam machining apparatus using a YAG cutting tool. A robot controller functioning as a YAG cutting tool controller is connected to a laser beam supply through a optical fiber and to a robot having an arm end on which the YAG cutting tool is mounted. When a diagrammatic machining command for the YAG cutting tool is given, an first internal program for the diagrammatic machining command and a second internal program for compensating a robot position in a z-axis direction are created. These internal programs are executed in parallel by a multi-task function. The YAG cutting tool is two-dimensionally controlled so as to depict a diagram, such as a rectangle and a circle. When the YAG cutting tool moves across the axis of a cylindrical workpiece, the robot position in the z axis direction is compensated so that the gap between the laser head and an cylindrical surface of the workpiece is kept constant.

3 Claims, 7 Drawing Sheets

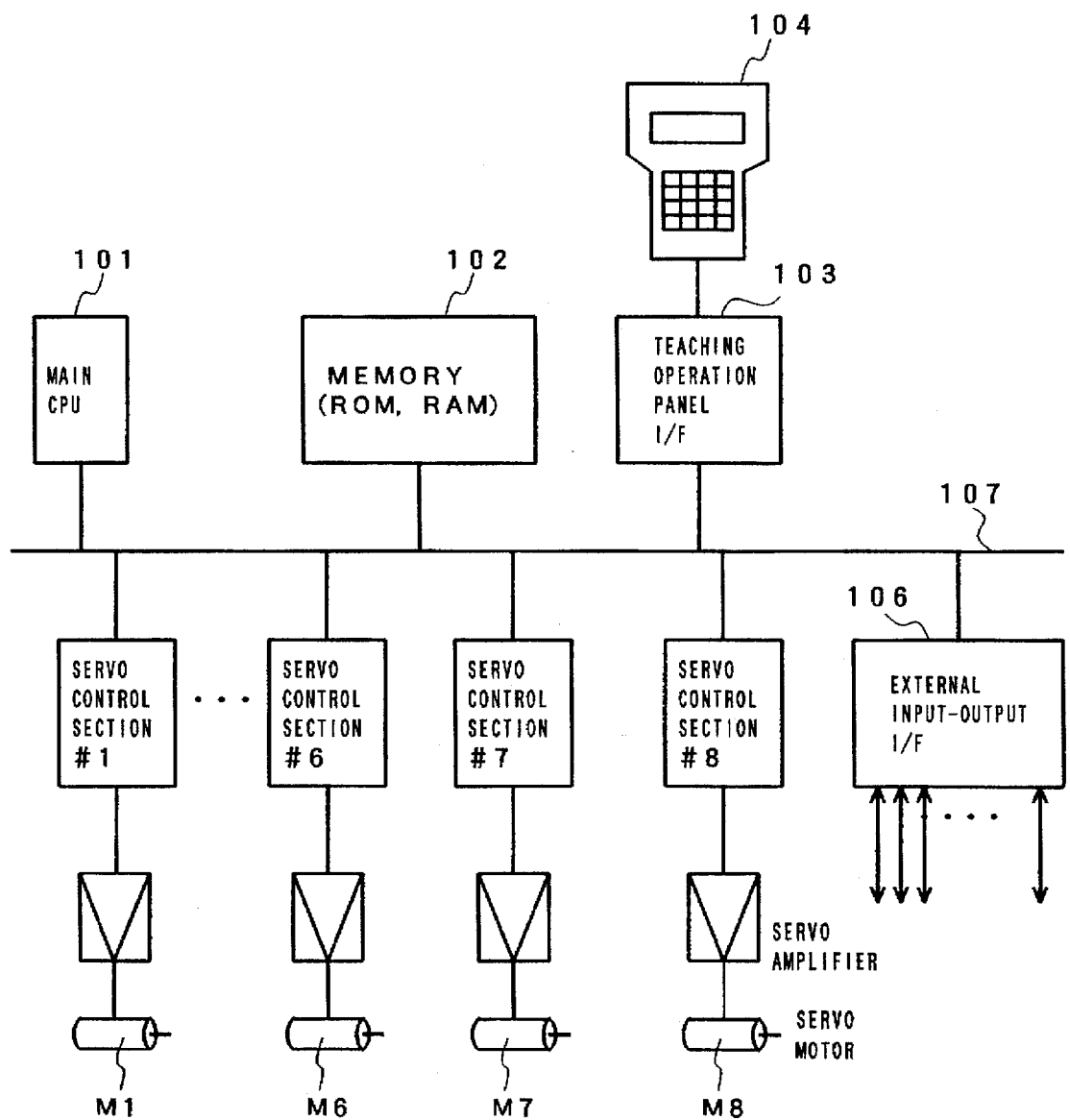
F I G. 5

THREE-DIMENSIONAL LASER BEAM MACHINING APPARATUS USING YAG CUTTING TOOL

BACKGROUND OF THE INVENTION

1. Field of the Invention The present invention relates to a three-dimensional laser beam machining apparatus using a YAG (yttrium-aluminum-garnet) cutting tool, and more particularly to a technology for carrying out three-dimensional machining on a workpiece by simultaneously controlling movement of an industrial robot and movement of the YAG cutting tool mounted on the robot for cutting a workpiece.

2. Description of the Related Art

The YAG cutting tool has a laser head movable on an operating plane and is generally used as being mounted on a distal end of a six-axis robot. A diagrammatic machining using the YAG cutting tool is customarily carried out in the following manner.

1) A central position of a diagram is taught to the robot. As shown in FIG. 1 of the accompanying drawings, in the case where a diagrammatic machining command is related to a rectangle, a central position x1 of the rectangle is taught as a position of the tool point of the robot.
2) The diagrammatic machining command is inputted. In the diagrammatic machining command, parameters for concretely specifying a machining diagram are set. For the rectangle shown in FIG. 1, a desired longitudinal length L1 and a desired transverse length L2 are set. These parameters may be inputted referring to a screen displaying the machining diagram as shown in FIG. 1.
3) The robot is moved to the taught position x1.
4) Machining is carried out according to the diagrammatic machining command. Position data for determining a path of movement of the YAG cutting tool is calculated at the time of execution of the machining command and is written in an internal program prepared in a control unit. Operating the YAG cutting tool by playing back the internal program, two axes of the YAG cutting tool are driven to carry out the machining. For example, in case of the rectangle of FIG. 1, positions of the points x2–x6 are calculated at the time of execution of the machining command and are automatically written in the internal program. In operating the YAG cutting tool by playing back the internal program, the machining is carried out in which the machining point moves along a path of $x1 \rightarrow x2 \rightarrow x3 \rightarrow x4 \rightarrow x5 \rightarrow x6 \rightarrow x2$.

Alternatively, the diagrammatic machining command is prepared by directly setting position data of x2–x6 in the internal program. It is a matter of course that the laser beam machining is actually carried out on the workpiece only in a section where the YAG cutting tool is moved as being energized or ignited.

It is preferable that a gap between the YAG cutting tool and the workpiece surface is kept in a range of approximately 1–2 mm during the laser beam machining. However, since the YAG cutting tool is of a two-axis structure, it can move on one plane but cannot move in a direction perpendicular to the plane.

Thus, for a planar workpiece, once a position of the six-axis robot carrying the YAG cutting tool is determined so that an appropriate gap is given between the workpiece surface and the laser head of the YAG cutting tool, the machining can be carried out maintaining the appropriate gap by executing the diagrammatic machining command. However, for machining a workpiece having a three-dimensional surface, such as a curved surface of a cylindrical workpiece, the above method cannot be adopted.

SUMMARY OF THE INVENTION

It is an object of the present invention to provide a laser beam machining apparatus which realizes three-dimensional machining using a YAG cutting tool operable on one plane.

A three-dimensional laser beam machining apparatus of the present invention comprises: a robot having a plurality of robot axes; a YAG cutting tool mounted on said robot and having a laser head movable on an operating plane; and general control means for controlling the individual axes of the robot and the YAG cutting tool by software processing. The general control means chronologically controls a two-dimensional position of the laser head based on a diagrammatic machining command for defining a path of movement of the laser head on the operating plane, and also chronologically control a position of the robot in a direction perpendicular to the operating plane of the laser head in accordance with the two-dimensional position of the laser head and a three-dimensional configuration of a surface of a workpiece to be machined.

The laser head of the YAG cutting tool is movable on the operating plane by two axes, each being driven by a servo motor. These two axes function as an additional axis of the robot axes. The general control means controls the two axes of the YAG cutting tool based on a diagrammatic machining command.

In a particularly preferable embodiment, the general control means creates a first internal program to carry out the diagrammatic machining by the laser head based on the diagrammatic machining command, and a second internal program in accordance with the movement of said laser head, which is determined by the first internal program, and in accordance with the three-dimensional configuration of the workpiece surface. These first and second internal programs are executed in parallel using the software processing function (multi-task function) of the general control means.

The first and second internal programs are created in such a manner that the movement of the laser head of the YAG cutting tool on the operating plane and the movement for compensating the robot position are chronologically harmonized with each other when these programs are executed by the multi-task processing, so that the laser head moves along the workpiece machining surface to thereby three-dimensionally depict a desired diagram.

BRIEF DESCRIPTION OF THE DRAWINGS

FIG. 5 is a block diagram showing a general architecture of a robot controller used in the embodiment of the invention;

DETAILED DESCRIPTION OF THE PREFERRED EMBODIMENT

Figure 2:
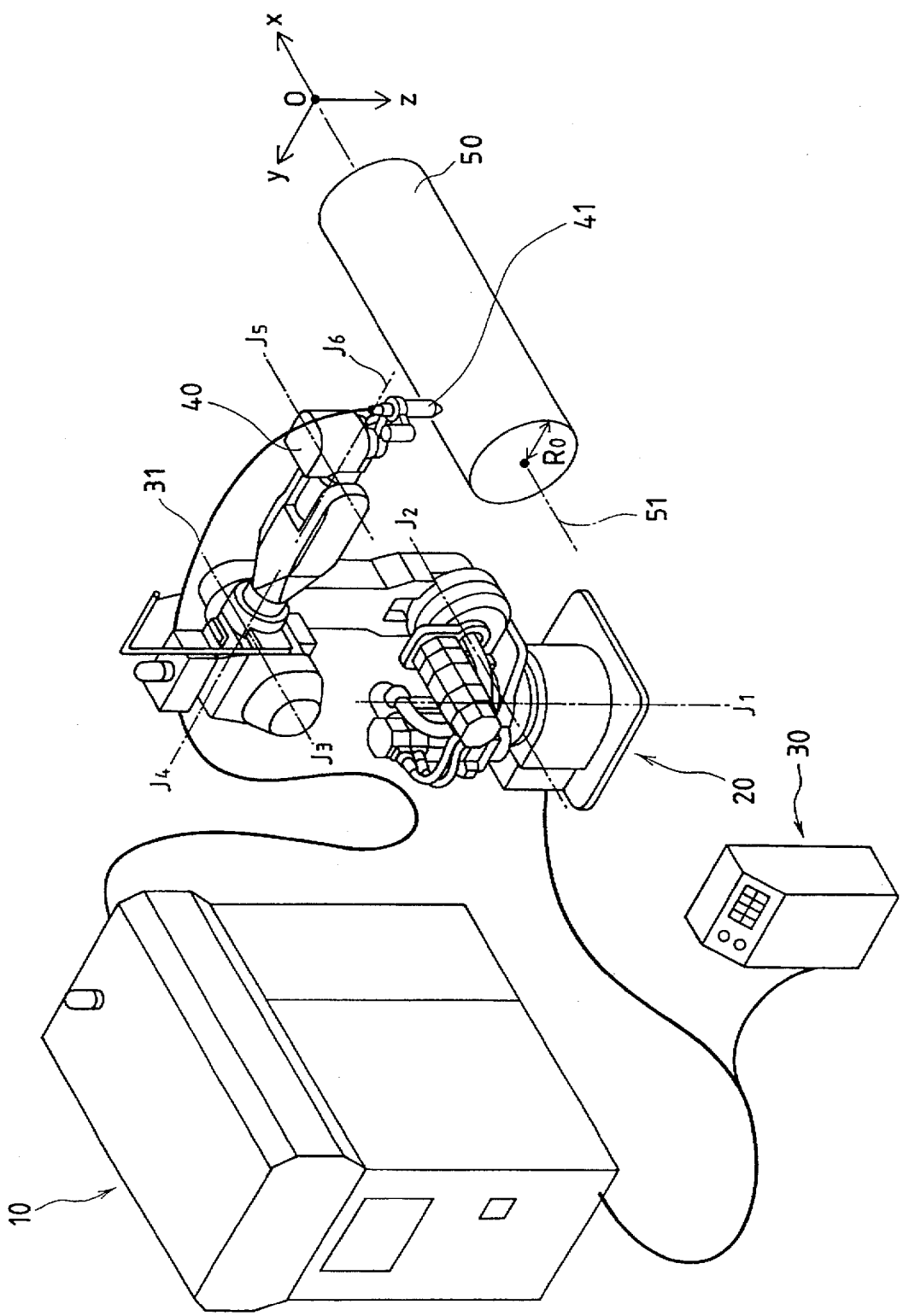
FIG. 2 is a perspective view showing an exterior of a three-dimensional laser beam machining apparatus of the present invention.

In FIG. 2, a robot 20 has a plurality of robot axes J1–J6 which are driven by respective servo motors. A robot controller 30 is connected to a laser beam supply 10 for supplying a YAG laser beam to a YAG cutting tool 40 through an optical fiber 31 and also to a six-axis robot 20 carrying the YAG cutting tool 40 on an arm end thereof, to generally control the robot 20 and the YAG cutting tool 40. In the laser beam supply 10, a YAG laser oscillator, a laser drive circuit, etc. are accommodated.

A workpiece 50 is in the shape of a cylinder having a radius R0 and is machined by the laser beam irradiated from a laser head 41. The cylindrical workpiece 50 is positioned on a non-illustrated workpiece table so that its axis 51 extends along the direction of x axis of a workpiece coordinate system O-xyz which is previously set in the robot controller 30.

Figure 3:
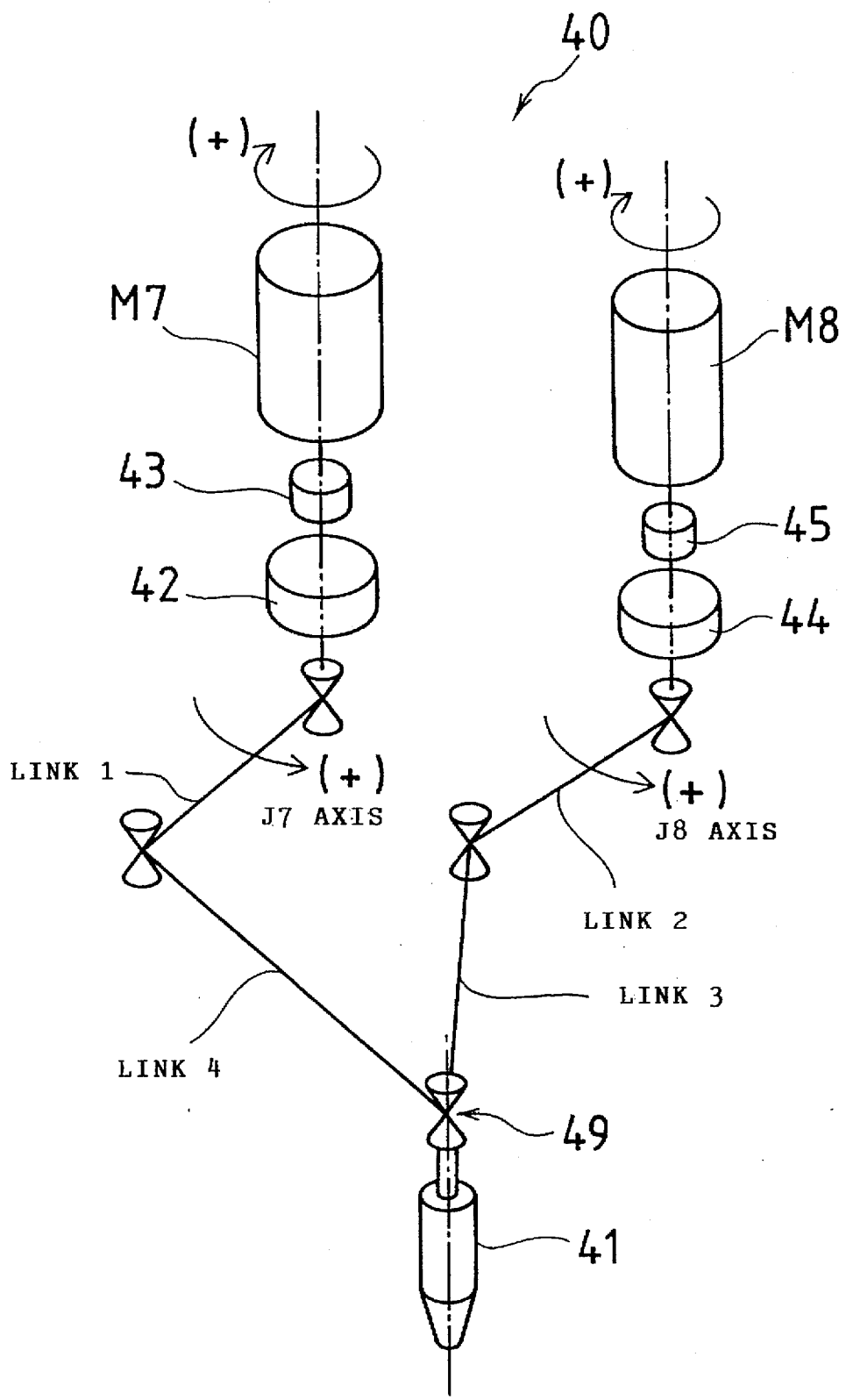
FIG. 3 is a schematic view of a linkage structure of a YAG cutting tool adopted in an embodiment of the present invention.

A linkage structure of the YAG cutting tool 40 will be described referring to FIG. 3. As shown in FIG. 3, the YAG cutting tool 40 comprises two additional axes J7 and J8 following the axes J1–J6 of the robot 20 shown in FIG. 2, and four links 1–4 connected to the additional axes J7 and J8 and arranged in a common plane or planes parallel to each other. The links 1 and 2 are respectively driven by servo motors M7 and M8 via speed reducers 42 and 44 having a reduction ratio of, e.g., 1/100. Two mechanical brakes 43 and 45 are disposed between the speed reducer 42 and the servo motor M7 and between the speed reducer 44 and the servo motor M8, respectively. The servo motor M7 and M8 drives the respective additional axes J7 and J8 under the control of the robot controller 30. The link 3 and link 4 are connected to each other at an end point 49 and the laser head 41 is mounted with its axis passing the point 49. This point 49 represents an attaching position of a laser beam condensing unit including the laser head 41, so it will be referred to an attaching point.

As the servo motors M7 and M8 rotate, the links 1 and 2 are driven via the speed reducers 42 and 44, respectively, and in response the link 4 connected to the link 1 and link 3 connected to the link 2 are actuated. At that time, since movement of the individual links 1–4 are arranged in the common plane or the parallel planes, the laser head 41 attached at the attaching point 49 moves two-dimensionally on an operating plane parallel to these planes.

Figure 4:
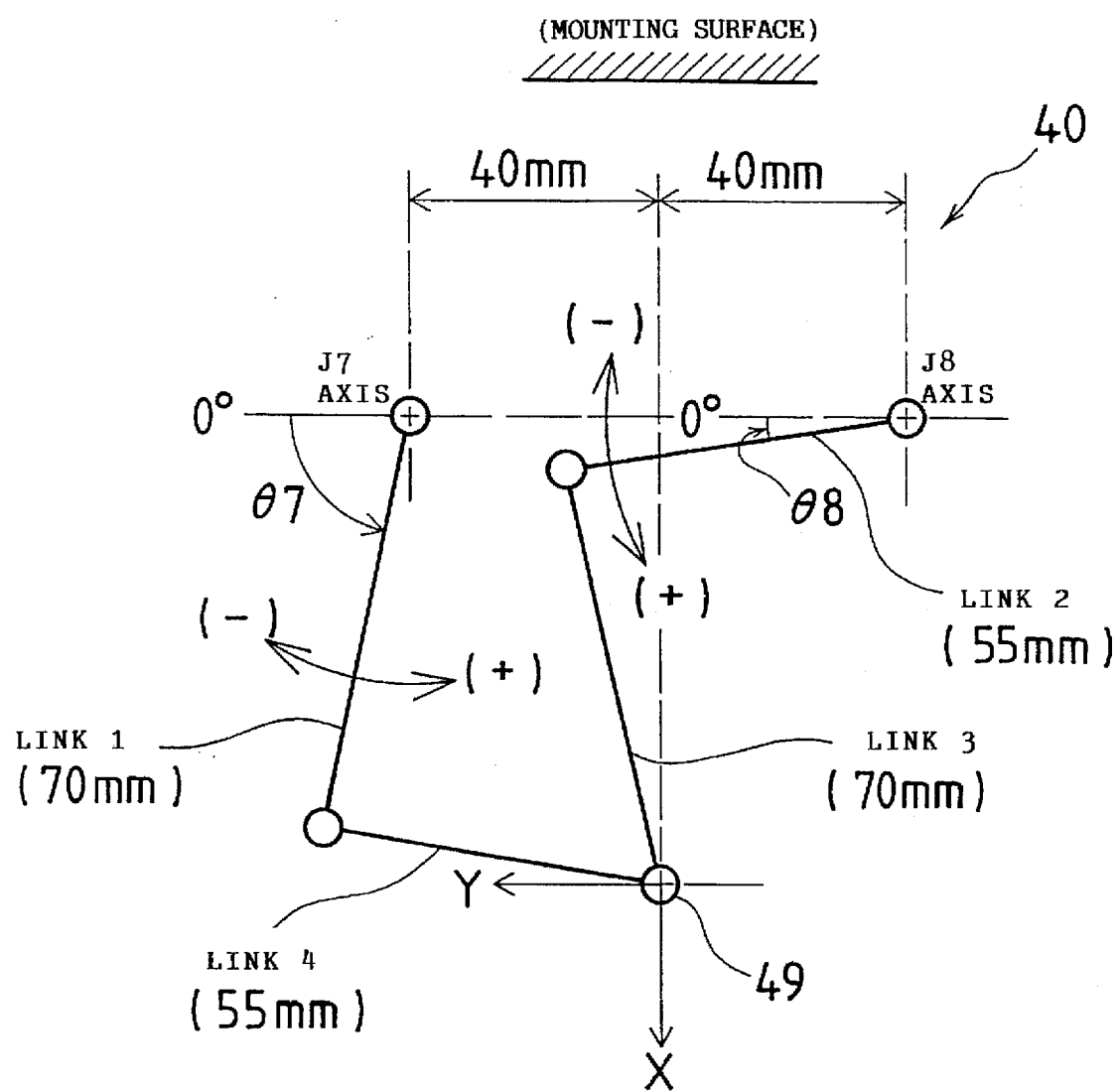
FIG. 4 is a diagram showing definition of angular variables and expression of positions in the linkage structure of FIG. 3 using concrete values of link lengths as exemplification.

Referring to FIG. 4, description will be made as to definition of angular variables of the additional axes J7 and J8, and expression of the positions, with respect to the linkage structure shown in FIG. 3 based on concrete values of link lengths.

As shown in FIG. 4, the angular variables $\theta 7$, $\theta 8$ of the additional axes J7, J8 are defined as angles between the links 1, 2 and a plane parallel to the mounting surface of the YAG cutting tool (the arm end of the robot). The position of the attaching point 49 is determined by the angular variables $\theta 7$, $\theta 8$ of the additional axes J7, J8 and the lengths of the individual links 1–4. In the illustrated example, an origin of the X-Y coordinate system set in the operating plane of the YAG cutting tool 40 is located in a position of the attaching point 49 when $\theta 7 = 78.178$ degrees and $\theta 8 = 8.875$ degrees. The position of the robot 20 (position of the tool point) is set to be coincide with the origin. FIG. 4 shows a status in which the attaching point 49 is positioned at the origin.

Data of the individual link lengths are previously set to the robot controller 30. Therefore, in the robot controller 30, when data representing a position of the attaching point 49 on the X-Y coordinate system is given, the values of the angular variables $\theta 7$, $\theta 8$ are calculated with ease by computation of the reverse conversion. The laser head 41 shown in FIG. 3 extends downwardly from the attaching point 49 perpendicularly to the plane of the drawing sheet of FIG. 4.

FIG. 5 shows a general arrangement of the robot controller 30 in the form of block diagram. As shown in FIG. 5, the robot controller 30 comprises a main central processing unit (CPU) 101. The CPU 101 is connected to memory 102 in the form of RAM and ROM, an interface 103 connected to a teaching operation panel 104, an input-output interface 106 for external devices such as a laser drive circuit (not shown), servo control sections #1–#6 for controlling the respective axes J1–J6 of the robot 20, and servo control sections #7, #8 for controlling the additional axes J7, J8, via a bus 107.

To the servo control sections #1–#6, servo motors M1–M6 for driving respective axes of the robot 20 via respective servo amplifiers. To the servo controllers #7, #8, the servo motors M7, M8 are connected for driving the respective additional axes J7, J8 of the YAG cutting tool 40 via respective servo amplifiers.

The teaching of the robot 20, the inputting of a diagrammatic machining command for the YAG cutting tool 40 and the setting of the coordinate system are performed using the teaching operation panel 104 having a liquid crystal display (LCD) screen. The diagrammatic machining command may be prepared either by inputting numerical values of respective position data of the attaching point or by setting the parameters on screen. The memory 102 stores necessary data, such as a program for the robot 20 with associated set data, set data of a diagrammatic machining command for the YAG cutting tool 40, a first internal program in accordance with to the diagrammatic machining command and a second internal program for compensating the position of the robot in the direction of the z axis.

On the bases of the arrangement and function of the system as described, further description will be made on the relationship between the diagrammatic machining command and the internal programs, the procedure of teaching, and the processing in the robot controller 30 in machining, with respect to a case where the machining is carried out on the cylindrical surface of the workpiece 50 having the radius R0, as shown in FIG. 2.

(1) For three-dimensional machining, it is necessary to set parameters for compensating the robot position in the direction of the z axis. For the cylindrical workpiece 50, a value of the workpiece radius R0 is set. The workpiece radius R0 may be inputted through a picture designed for inputting the diagrammatic machining command or through a picture dedicated for setting the workpiece radius, independently of inputting of the diagrammatic machining command. The value of the workpiece radius R0 is usually set in unit of millimeters. For a planner machining which does not require compensation of the robot position in the z axis direction, the value of workpiece radius R0 is set to 0.00 mm.

(2) The diagrammatic machining command includes a command for reset as well as commands for machining of a rectangle, a circle, a slot, a cornered rectangle. The reset command is for returning the position (X, Y) of the attaching point 49 to the origin (X=0.0; Y=0.0).

The first internal program is prepared for each diagrammatic machining command for the execution thereof. An example of the diagrammatic machining command and the first internal program for the machining command are shown below for the machining to form a rectangular hole. As described later, in this embodiment, this first internal program is modified in order to execute a second internal program for correcting the robot position in the z axis direction (hereinafter the second program is referred to "z-axis compensation program") for three-dimensional machining, by parallel processing (multi-task function).

[Diagrammatic Machining Command]

Figure 1:
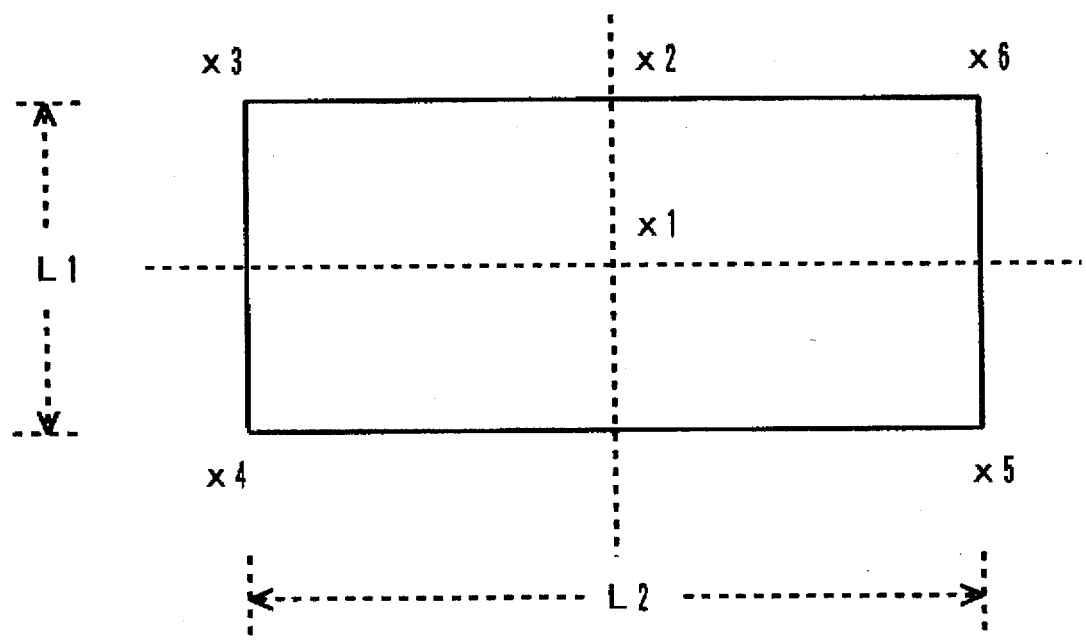
FIG. 1 is a schematic diagram representing a diagrammatic machining command for a YAG cutting tool.

:RECT L1 20.00mm  RECT L2 10.00mm
:R 0.0mm  REV-0.0deg
:LP[1]  OFFSET
:LS[1]  25mm/sec In the above example, RECT L1 20.00 mm and RECT L2 10.00 mm means that the axial length L1 and the length L2 in a direction perpendicular to the axis are set to 20.00 mm and 10.00 mm, respectively, by the indirect designation. These values are designated by the user. In the direct designation, values of the position data of the points x2, x3, ..., x6 in FIG. 1 are set.

R 0.0 mm indicates that corners of the rectangle are not to be rounded. If the corners of the rectangle are to be rounded by a radius of 3 mm, R=3.0 mm is set, for example. REV-0.0 deg indicates the posture of a machining diagram in terms of turning angle from the reference posture. The reference posture is set in this example.

Further, LP[1], LS[1] are laser commands indicating piercing and cutting, respectively. The numeral in [] represents a laser beam irradiating condition (such as intensity of laser beam) previously set in a condition table. In this example, condition 1 is designated for piercing and severing.

[Internal Program Based On Diagrammatic Machining Command]

| | | |
|---|---|---|
| 1:J | P[1:Home] | 100% POSITIONING |
| 2:L | P[2] | Ofst-V POSITIONING |
| 3: | LP[1] | |
| 4:L | P[3] | Proc-V POSITIONING |
| 5: | LS[1] | |
| 6:L | P[4] | Proc-V POSITIONING |
| 7:L | P[5] | Proc-V POSITIONING |
| 8:L | P[6] | Proc-V POSITIONING |
| 9:L | P[7] | Proc-V POSITIONING |
| 10:L | P[8] | Proc-V POSITIONING |
| 11: | LE | |
| 12:L | P[1:Home] | Ofst-V POSITIONING |

Figure 6:
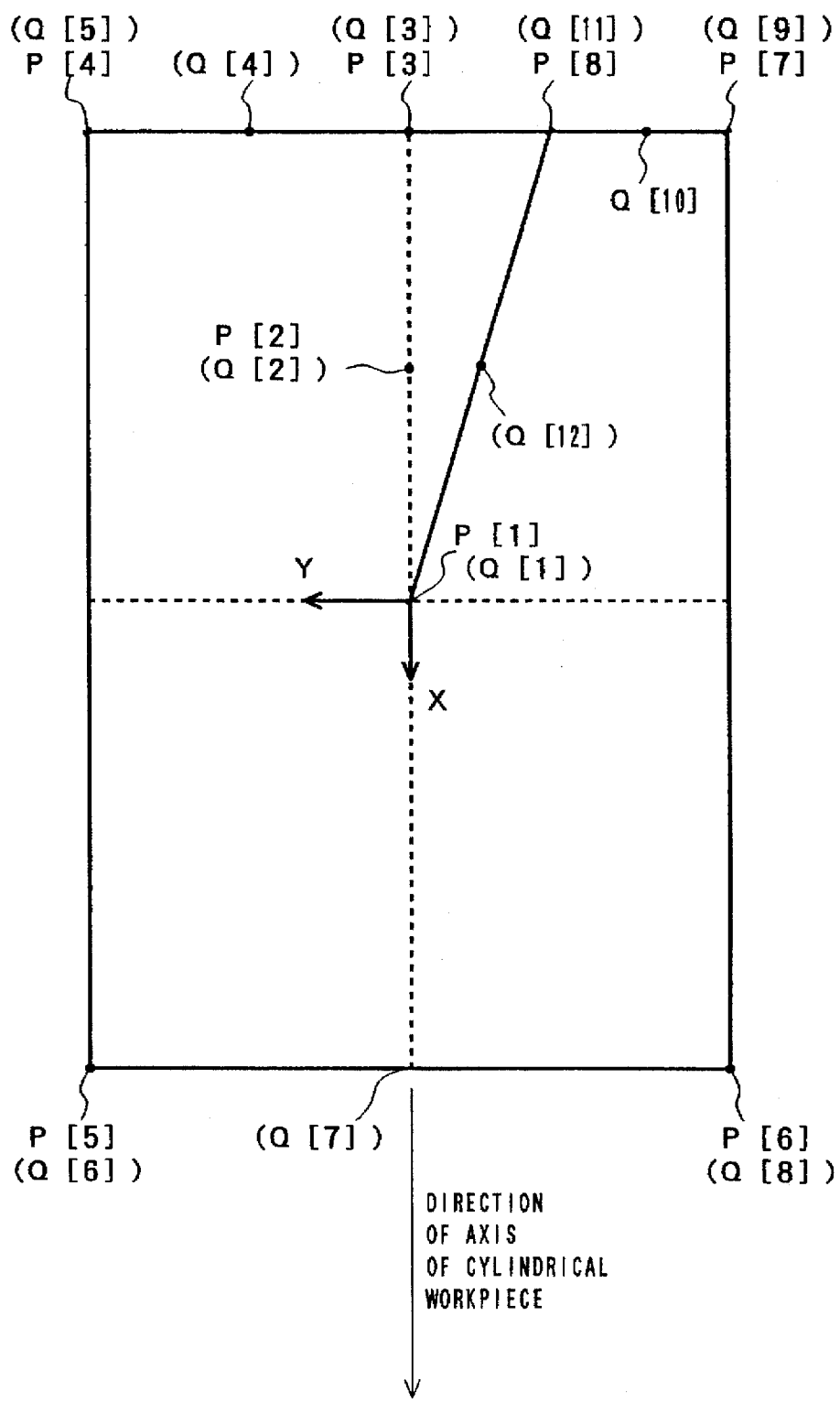
FIG. 6 is a diagraming showing a machining diagram and positions of individual points in the machining diagram.

In the above program, J indicates a movement of each axis J7, J8, and L indicates a linear movement. Ofst-V and Proc-V are commands for setting a speed of movement at the time of offset (movement from a center of the diagram to machining diagram line) and a speed of movement during execution of diagrammatic machining, respectively; values of speed V are designated by the user. LE is a command relating to laser beam like LP, LS and indicating termination of energizing of laser. P[1]–P[8] represent positions of the individual points describing the rectangle as shown in FIG. 6. P[1:Home] represents position of the origin of the YAG cutting tool 40.

(3) Independently of the first internal program for the diagrammatic machining command, a z-axis compensating program (second internal program) for compensating the position of the six-axis robot in the z axis direction in accordance with the position (X, Y) of the attaching point 49 is automatically created in the robot controller 30. The second internal program is prepared on the basis of the existing commands. One example of the z-axis compensating program associated with the above-mentioned first internal program for diagrammatic machining command is shown below.

| | | | |
|---|---|---|---|
| 1:WAIT | a[sec] | | |
| 2:C | Q[4] | α sec | CNT |
| : | Q[5] | α sec | CNT |
| 3:WAIT | b[sec] | | |
| 4:C | Q[7] | β sec | CNT |
| : | Q[8] | β sec | CONT |
| 5:WAIT | c[sec] | | |
| 6:C | Q[10] | γ sec | CNT |
| : | Q[11] | γ sec | CNT |
| 7:C | Q[12] | η sec | CNT |
| : | Q[1] | η sec | CNT |

In the above program, WAIT indicates a waiting command, L indicates a command for a linear movement, and C indicates a command for a circular arc movement. For machining on a curved surface of a cylinder, the type of movement includes a circular arc movement. Further, the speed of movement is designated in terms of time periods $\alpha$, $\beta$, $\gamma$ and $\eta$. The value of each of $\alpha$, $\beta$, $\gamma$ and $\eta$ is calculated in the robot controller 30 from machining speed, position data, time constant of acceleration/reduction control, et., which are set by the user. The same time constant of acceleration/reduction control is set for axes J1–J8. CNT indicates a smooth movement (positioning ratio 0%).

The z-axis compensating movement is made in the coordinate system on the robot side (workpiece coordinate system), and Q[1]–Q[12] indicate position data expressed in the workpiece coordinate system (Symbol P is usually used for position data, but in this case, Q is used to avoid confusion with position data P[1]–P[8] in a diagrammatic machining command).

(4) For simultaneously executing such z-axis compensating program and the first internal program for the diagrammatic machining command in parallel by the multi-task function, the first internal program for the diagrammatic machining command shown in paragraph (2) is modified by adding a starting command of the z-axis compensating program, as follows:

[Internal Program for Diagrammatic Machining Command (For Multi-task)]

| | | |
|---|---|---|
| 1:J | P[1:Home] | 100% POSITIONING |
| 2:RUN | Z-AXIS-COMPENSATING PROGRAM | |
| 3:L | P[2] | Ofst-V1 POSITIONING |
| 4: | LP[1] | |
| 5:L | P[3] | Proc-V2 POSITIONING |
| 6: | LS[1] | |
| 7:L | P[4] | Proc-V3 POSITIONING |
| 8:L | P[5] | Proc-V4 POSITIONING |
| 9:L | P[6] | Proc-V5 POSITIONING |
| 10:L | P[7] | Proc-V6 POSITIONING |
| 11:L | P[8] | Proc-V7 POSITIONING |
| 12: | LE | |
| 13:L | P[1:Home] | Ofst-V8 POSITIONING |

In the above program, RUN is a command for starting another program and the z-axis compensating program is started upon execution of this command.

(5) All the internal programs are created in the robot controller 30 at the time of starting the system, provided that position data are left blank. These internal programs are generally not shown in a program table called on the screen of the teaching operation panel 104 and are possessed in an invisible form in the robot controller 30. However, they can be shown in the program table using a flag such as system variable.

Figure 7:
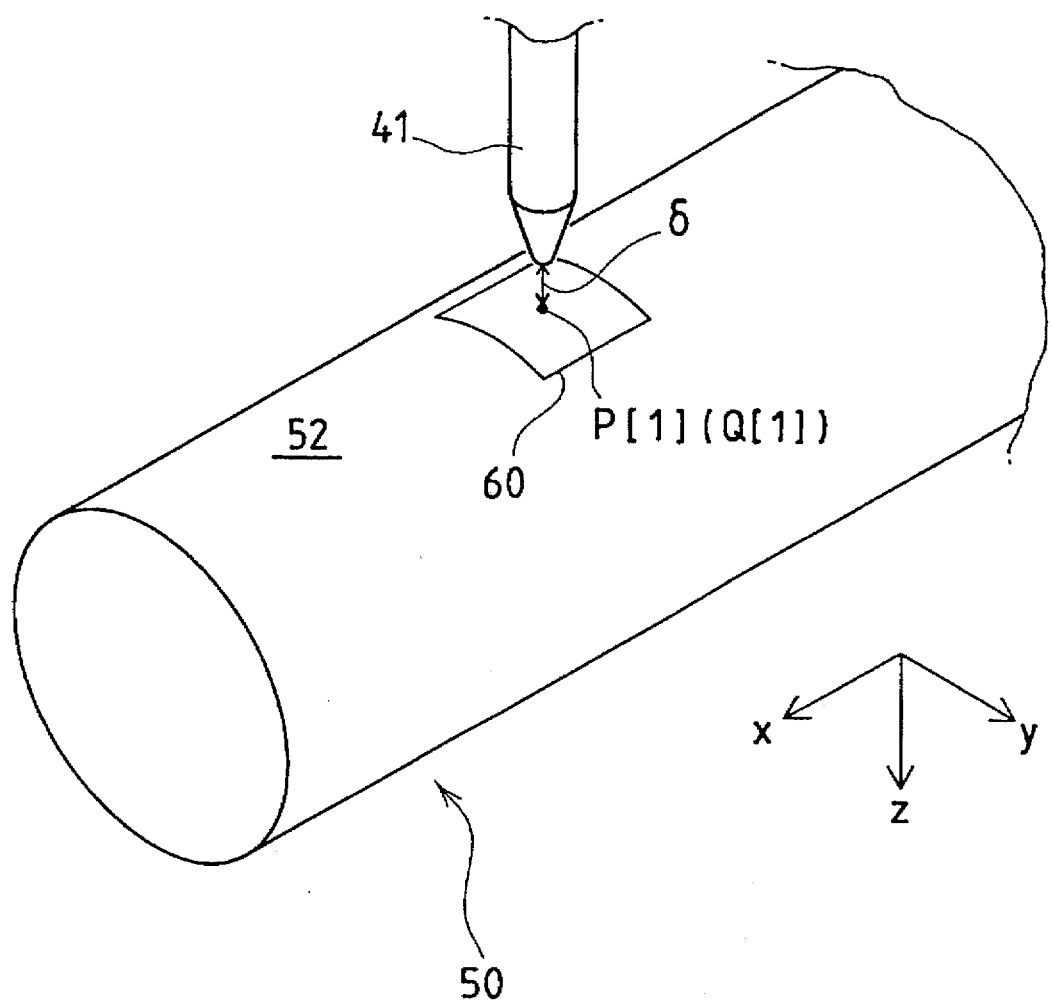
FIG. 7 is a schematic perspective view showing the manner in which a central position of the machining diagram is taught to the robot.

(6) On the basis of the foregoing matters as premise, a procedure of carrying out the machining will be described further referring to FIG. 7.

I) First, the attaching point 49 of the YAG cutting tool 40 returned to the origin and the robot 20 is jogged toward the machining position of the cylindrical workpiece 50. Then, as shown in FIG. 7, the laser head 41 is brought to a position right above the central position P[1] of a machining diagram 60 (a rectangle in this example), and the position in the z-axis direction is adjusted by jog operation so that the appropriate gap δ is formed between the workpiece surface 52 and the laser head 41.

At this stage, the current position data of the robot 20 is fetched in the robot controller 30 as the position data for Q[1]. Thus, the position data Q[1] is taught in the z-axis compensating program. The coordinate value of Q[1] taught at that time is deemed to be (x1, y1, z1).

As mentioned above, the axis of the cylindrical workpiece 50 is aligned with the x-axis of the workpiece coordinate system. Therefore, at the time of teaching of Q[1], the robot 41 assumes such a posture that the operating plane (X-Y plane) of the YAG cutting tool 40 is parallel to the x-y plane of the workpiece coordinate system (i.e. the posture in which the laser head 41 is directed downwardly).

II) The position data of other points Q[2]–Q[12] for the z-axis compensating program is taught inside as follows:

Q[2]=(x1, y1, z2)
Q[3]=(x1, y1, z3)
Q[4]=(x1, y1, z4)
Q[5]=(x1, y1, z5)
Q[6]=(x1, y1, z6)
Q[7]=(x1, y1, z7)
Q[8]=(x1, y1, z8)
Q[9]=(x1, y1, z9)
Q[10]=(x1, y, z10)
Q[11]=(x1, y1, z11)
Q[12]=(x1, y1, z12)

Since the robot 20 makes only a position compensating movement in the direction of z axis, the same values as Q[1] are set to the x-y coordinate values of Q[2] and all the following points. The z-axis coordinate values z2–z12 are calculated from the radius R0 of the cylindrical workpiece 50 and L2 as follows:

$z1=z2=z3=z7$ (same as Q[1])
$z5=z6=z8=z9=z1+[R0-\{R0^2-(L2/2)^2\}^{1/2}]$ mm
$z4=z11=z1+[R0-\{R0^2-(L2/4)^2\}^{1/2}]$ mm
$z10=z1+[R0-\{R0^2-(L2\cdot3/8)^2\}^{1/2}]$ mm
$z12=z1+[R0-\{R0^2-(L2/8)^2\}^{1/2}]$ mm III) With respect to P[1]–P[3], as no movement is made in the z-axis direction, the waiting time a of the wait command WAIT a is calculated to be taught in the robot controller 30. Likewise, the waiting time b for P[4]–P[5] and the waiting time c for P[6]–P[7] are calculated to be taught in the robot controller 30.

These calculations are executed based on the speed of the machining operation and the time contact of the acceleration/deceleration control, which are set by the user. For example, the Waiting time a is calculated as a time period for the YAG cutting tool 40 to move from P[1] to P[3]. Likewise, the waiting time b is calculated as a time period for the YAG cutting tool 40 to move from P[4] to P[5], and the waiting time c is calculated as a time period for the YAG cutting tool 40 to move from P[6] to P[7].

IV) The operating time α is calculated as ½ of a time period for the YAG cutting tool 40 to move from P[3] to P[4]. Likewise, the operating time β is calculated as ½ of a time period for the YAG cutting tool 40 to move from P[5] to P[6], and the operating time γ is calculated as ½ of a time period for the YAG cutting tool 40 to move from P[7] to P[8]. Further, the operating time η is calculated as ½ of a time period for the YAG cutting tool 40 to move from P[8] to P[1] (return to the origin).

V) Upon completion of preparation of the internal programs in the above-mentioned manner, when a command for starting the machining is given through the teaching operation panel 104 or as an external signal, the robot 20 is moved to the taught position Q[1], and the internal program of the above-mentioned diagrammatic machining command is started.

First, a command for returning to the origin is read and executed to return the YAG cutting tool 40 to the origin. Then, a command for starting the z-axis compensating program is read and executed, to thereby start a parallel process of the z-axis compensating program by the multi-task function.

The YAG cutting tool 40 starts a linear motion from P[1] to P[3]. At the point P[2] on the way to P[3], piercing is started and from P[3] the laser beam machining is started.

At the time of arriving at P[3], the waiting time a of the robot 41 terminates, and the robot 41 starts a movement for compensating the position in the z-axis direction. Since the moving time in the z-axis direction is set in conformity with the machining time from P[3] to P[4], the movement of robot 41 stops in the z-axis direction when the YAG cutting tool 40 arrives at P[4].

Then, only the YAG cutting tool 40 moves from P[4] to P[5]. During that time (waiting time b), the robot 20 does not make any movement in the z axis direction. Then, at the time of arriving at P[5], the waiting time b of the robot terminates and the movement for the compensation in the z-axis direction restarts. Since the moving time in the z-axis direction is set in conformity with the machining time from P[5] to P[6], the movement in the direction of z axis stops when the YAG cutting tool 40 arrives at P[6].

Further, the movement from P[6] to P[7] is performed only by the YAG cutting tool 40. During that time (waiting time c), the robot 20 does not make any movement in the z axis direction. Then, synchronized with the arriving time at P[7], the waiting time c of the robot terminates, and the movement of the robot restarts for the compensation in the z-axis direction. As the moving time γ is set in conformity with the machining time from P[7] to P[8], the movement in the direction of z axis ends upon arrival of the YAG cutting tool 40 at P[8], but further continues in conformity with the starting time from P[8], to perform the compensation in the z-axis direction, which is designated by the moving time η. This movement in the direction of z axis ultimately terminates upon arrival of the YAG cutting tool 40 at P[1] (return to the origin).

As described above, machining along an cylindrical surface is achieved by harmonizing the control of two-dimensional movement X, Y control) of the YAG cutting tool 40 with the control of the robot position in the direction of z axis through the multi-task processing of the first internal program for the diagrammatic machining command and the second internal program of the z-axis compensating program. In the case where the surface to be machined is not cylindrical, three-dimensional machining can be performed by modifying the content of the z-axis compensating internal program to meet the configuration of the surface to be machined.

What is claimed is:

1. A three-dimensional laser beam machining apparatus comprising:
   a robot having a plurality of robot axes;

a YAG cutting tool mounted on said robot and having a laser head movable on an operating plane; and general control means for controlling the individual axes of said robot and said YAG cutting tool by software processing, wherein said general control means chronologically controls a two-dimensional position of said laser head based on a diagrammatic machining command for defining a path of movement of said laser head on said operating plane, and also chronologically controls a position of said robot in a direction perpendicular to said operating plane of said laser head in accordance with said two-dimensional position of said laser head and a three-dimensional configuration of a surface of a workpiece to be machined.

2. A three-dimensional laser beam machining apparatus comprising:

a robot having a plurality of robot axes;

a YAG cutting tool mounted on said robot and having two axes, each being driven by a servo motor and functioning as an additional axis of said robot axes, and a laser head movable on an operating plane by said two axes; and general control means for controlling the individual robot axes of said robot and said YAG cutting tool by software processing, wherein said general control means chronologically controls a two-dimensional position of said laser head through said two axes of said YAG cutting tool based on a diagrammatic machining command for defining a path of movement of said laser head on said operating plane, and also chronologically controls a position of said robot in a direction perpendicular to said operating plane of said laser head in accordance with said two-dimensional position of said laser head and a three-dimensional configuration of a surface of a workpiece to be machined.

3. A three-dimensional laser beam machining apparatus comprising:

a robot having a plurality of robot axes;

a YAG cutting tool mounted on said robot and having two axes, each being driven by a servo motor and functioning as an additional axis of said robot axes, and a laser head movable on an operating plane by said two axes; and general control means or controlling the individual robot axes of said robot and said YAG cutting tool by software processing, wherein said general control means chronologically controls a two-dimensional position of said laser head through said two axes of said YAG cutting tool based on a diagrammatic machining command or defining a path of movement of said laser head on said operating plane, and also chronologically controls a position of said robot in a direction perpendicular to said operating plane of said laser head in accordance with said two-dimensional position of said laser head and a three-dimensional configuration of a surface of a workpiece to be machined, said general control means creates a first internal program to carry out the diagrammatic machining by said laser head based on said diagrammatic machining command, and a second internal program in accordance with the movement of said laser head, which is determined by said first internal program, and with said three-dimensional configuration of the workpiece surface, to execute said first and second internal programs in parallel.

* * * * *